(12) United States Patent
Baba

(10) Patent No.: US 7,353,348 B2
(45) Date of Patent: Apr. 1, 2008

(54) NONVOLATILE MEMORY AND CARD READER PROVIDED WITH THE SAME

(75) Inventor: Tsutomu Baba, Nagano (JP)

(73) Assignee: Nidec Sankyo Corporation (JP)

( * ) Notice: Subject to any disclaimer, the term of this patent is extended or adjusted under 35 U.S.C. 154(b) by 176 days.

(21) Appl. No.: 11/321,360

(22) Filed: Dec. 28, 2005

(65) Prior Publication Data

US 2006/0143369 A1    Jun. 29, 2006

(30) Foreign Application Priority Data

Dec. 28, 2004   (JP)   ............... 2004-379233

(51) Int. Cl.
*G06F 13/00*   (2006.01)

(52) U.S. Cl. ............ 711/156; 711/101; 711/103; 711/107; 711/115

(58) Field of Classification Search ........ 711/101, 711/103, 107, 115, 156
See application file for complete search history.

(56) References Cited

U.S. PATENT DOCUMENTS 5,477,492 A * 12/1995 Ohsaki et al. ............. 365/200
5,561,671 A * 10/1996 Akiyama .................... 714/799
5,831,903 A * 11/1998 Ohuchi et al. ......... 365/185.22

FOREIGN PATENT DOCUMENTS

JP    2000-105694    4/2000

* cited by examiner

*Primary Examiner*—Reba I. Elmore
(74) *Attorney, Agent, or Firm*—Cantor Colburn LLP

(57) ABSTRACT

A nonvolatile memory may include a plurality of blocks as a unit for performing writing and erasing of data which is stored in the respective blocks. The block may include a write data area in which data is written and stored, a correlative code area in which a correlative code indicating a correlation between the data which are written in the respective write data areas of the respective blocks is stored, and an inspection data area in which inspection data required in inspection is stored in the respective blocks for inspecting the validity of the data.

5 Claims, 3 Drawing Sheets

[Fig.1]
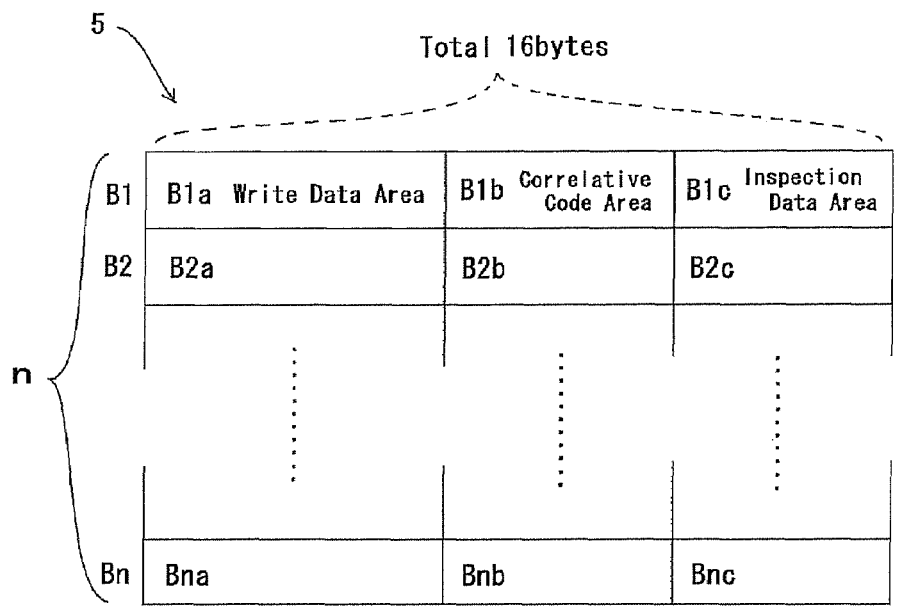
[Fig.2]
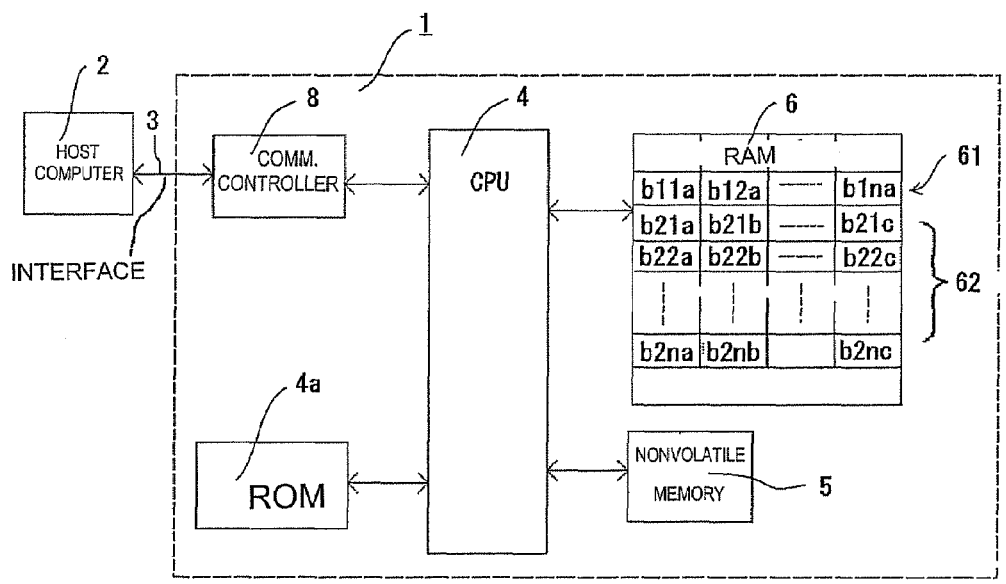

US 7,353,348 B2

NONVOLATILE MEMORY AND CARD READER PROVIDED WITH THE SAME

CROSS REFERENCE TO RELATED APPLICATION

The present invention claims priority under 35 U.S.C. §119 to Japanese Application No. 2004-379233 filed Dec. 28, 2004, which is incorporated herein by reference.

FIELD OF THE INVENTION

An embodiment of the present invention may relate to a nonvolatile memory in which a plurality of blocks as a unit for performing writing and erasing data is provided and data is stored in the respective blocks and may relate to a card reader provided with the nonvolatile memory.

BACKGROUND OF THE INVENTION

A nonvolatile memory is a memory in which stored data is preserved even when supply of electric power is cut off. Therefore, the nonvolatile memory is referred to as a content-holding type of memory. A nonvolatile memory is commonly provided with a plurality of blocks which is a unit for performing writing and erasing data. Each of the respective blocks comprises a write data area for principally storing data and an inspection data area for inspecting the validity of data written in the write data area and storing inspection data obtained in the inspection. Further, for example, in the case of an EEPROM among nonvolatile memories, one block is often provided with a capacity of 16 bytes, which is allocated in an inspecting data area with one or two bytes and in a write data area with remaining bytes. An address specifying its location is added to the respective bytes.

Specifically, the inspection data area is provided with a BCC (Block Check Character) and a flag to judge whether the data stored in the write data area is accurately stored or not, i.e., the validity of stored data.

In such a nonvolatile memory, for example in the flash memory shown in Japanese Patent Laid-Open No. 2000-105694, a history showing that updating processing has been finished is recorded in a flag area in the respective blocks whenever respective steps of the updating processing have been finished. The flag area includes, for example, "rewriting start flag", "rewriting finish flag", "verify error flag", "verify finish flag", "erasure finish flag" and the like. Flag areas with the above-mentioned respective flags are confirmed at the time of starting of programs to confirm whether updating processing is normally performed at a predetermined position and to detect which step of the processing is discontinued. In this manner, an error in the overwriting processing for the respective blocks is prevented. Therefore, the error in the updating processing can be checked at a plurality of points from the history recorded in the flag areas and thus malfunction of the program can be prevented.

However, for example, data handled in a financial terminal such as a card reader is important data. Therefore, encryption processing may be performed on data transmitted from a host computer to enhance security and, in this case, key data used in the encryption processing may be stored in a nonvolatile memory. In recent years, the data length of the key data has become longer to further enhance the security. Therefore, the data may become larger than the capacity of the write data area and thus the data cannot be stored in one block. As a result, the data are divided into a plurality of blocks to be stored.

In the case that the data are divided and stored into a plurality of blocks, when a problem such as interruption of power supply occurs during updating of the data and the updating is interrupted, all of the blocks may not be updated. Specifically, the following cases may occur:
1. the updating is interrupted in the middle of rewriting of the data in the respective blocks.
2. the updating is interrupted between two blocks. In other words, new data is recorded in one block but other remaining blocks are not be rewritten and remain in a state with old data. Both cases are errors in the updating processing.

In the flash memory described in the above-mentioned prior art, an error can be detected when updating is interrupted in the middle of rewriting the data in the above-mentioned respective blocks. However, in the above-mentioned prior art, whenever each of the respective steps of the updating processing has been finished in one block, a history indicating the finish of the respective steps is recorded in the flag area and thus it cannot be detected whether the data stored in the respective blocks is new data or old data. In other words, in the case that data is divided and stored into a plurality of blocks, an error cannot be detected when updating is interrupted between the updated block and the next block to be updated as described in the above-mentioned the case number 2. Therefore, when the interruption of power supply occurs during updating processing, the block where data is updated may coexist with the block where old data is stored.

In addition, in a card reader provided with the flash memory described in the above-mentioned prior art, a plurality of blocks where new data and old data coexist cannot be detected as described above and thus the card reader may be activated. Therefore, an abnormality is noticed only after a card has been inserted into a card reader and the card reader has been actually operated. Accordingly, the entire system including the card reader is required to be stopped and thus a user, for example a card holder may be subjected to a malfunction.

BRIEF DESCRIPTION OF THE INVENTION

In view of the problems described above, an embodiment of the present invention may advantageously provide a nonvolatile memory which is provided with a means capable of judging a correlation between data that are divided and stored in a plurality of blocks when the data is divided into a plurality of the blocks, and provide a card reader provided with the nonvolatile memory.

Thus, according to an embodiment of the present invention, there may be provided a nonvolatile memory including a plurality of blocks as a unit for performing writing and erasing data which is stored in the respective blocks. The block includes a write data area in which data is written and stored, a correlative code area in which a correlative code indicating a correlation between the data which are written in the respective write data areas of the respective blocks is stored, and an inspection data area in which inspection data inspecting validity of the data and obtained in the inspection is stored in the respective blocks.

In accordance with an embodiment, the nonvolatile memory includes an inspection data area in which inspection data inspecting validity of the data and obtained in the inspection is stored in the respective blocks. Therefore, for example, even when updating of the data is interrupted by the interruption of power supply or the like, it can be surely detected whether the data written in the write data areas in the respective blocks are accurately updated or not by inspecting the inspection data stored in the inspection data areas.

In addition, the nonvolatile memory includes a correlative code area in which a correlative code indicating a correlation between the data which are written in the respective write data areas of the respective blocks is stored. Therefore, for example, in the case that data having a larger capacity than the write data areas in the respective blocks is divided and stored in the write data areas in a plurality of the blocks, even when updating of the data is interrupted by the interruption of power supply, the correlation between a plurality of the blocks can be detected. In other words, for the data which is to be divided and stored in a plurality of the blocks, for example, even when new data is stored in a first block and old data is not updated and left stored in a second block, the correlation between a plurality of the blocks can be detected by inspecting the correlative code. Therefore, it can be judged whether all the stored data is updated to be changed into the new data by the inspection of the correlative code, and thus even when both the new data and the old data are stored as described above, it can be surely detected.

Further, in accordance with an embodiment, the correlative code area is constructed of a counter. Therefore, a complicated program is not required to obtain the correlative code and the correlative code is obtained by increasing or decreasing a predetermined number and thus, a simple and fast processing can be attained.

Further, in accordance with an embodiment, the nonvolatile memory is provided in a card reader.

According to an embodiment of the present invention, the card reader is provided with a nonvolatile memory having a correlative code area and an inspection data area. Therefore, it can be surely detected whether the data which is written in the write data areas in the blocks is accurately updated or not by inspection of the inspection data which is stored in the inspection data area.

In addition, the nonvolatile memory is provided with a correlative code area. Therefore, for example, in the case that data having a larger capacity than the write data areas in the blocks is divided and stored in the write data areas in a plurality of blocks, even when updating of the data is interrupted by the interruption of power supply or the like, the correlation between a plurality of the blocks can be detected by inspection of the correlative code. In other words, for the data which are divided and stored in a plurality of the blocks, even when the new data is stored in a first block and old data is not updated and left stored in a second block, the correlation between a plurality of the blocks can be detected by inspection of the correlative code at the time of staring of a card reader or the like. In this manner, abnormality of the card reader can be detected before a user inserts a card, and thus the entire system including the card reader is not required to be stopped and a user may not be subjected to a trouble.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a schematic explanatory view showing the construction of an EEPROM in accordance with an embodiment of the present invention.

FIG. 2 is a block diagram showing a system of a card reader which is provided with an EEPROM in accordance with an embodiment.

DESCRIPTION OF THE PREFERRED EMBODIMENTS

Figure 3:
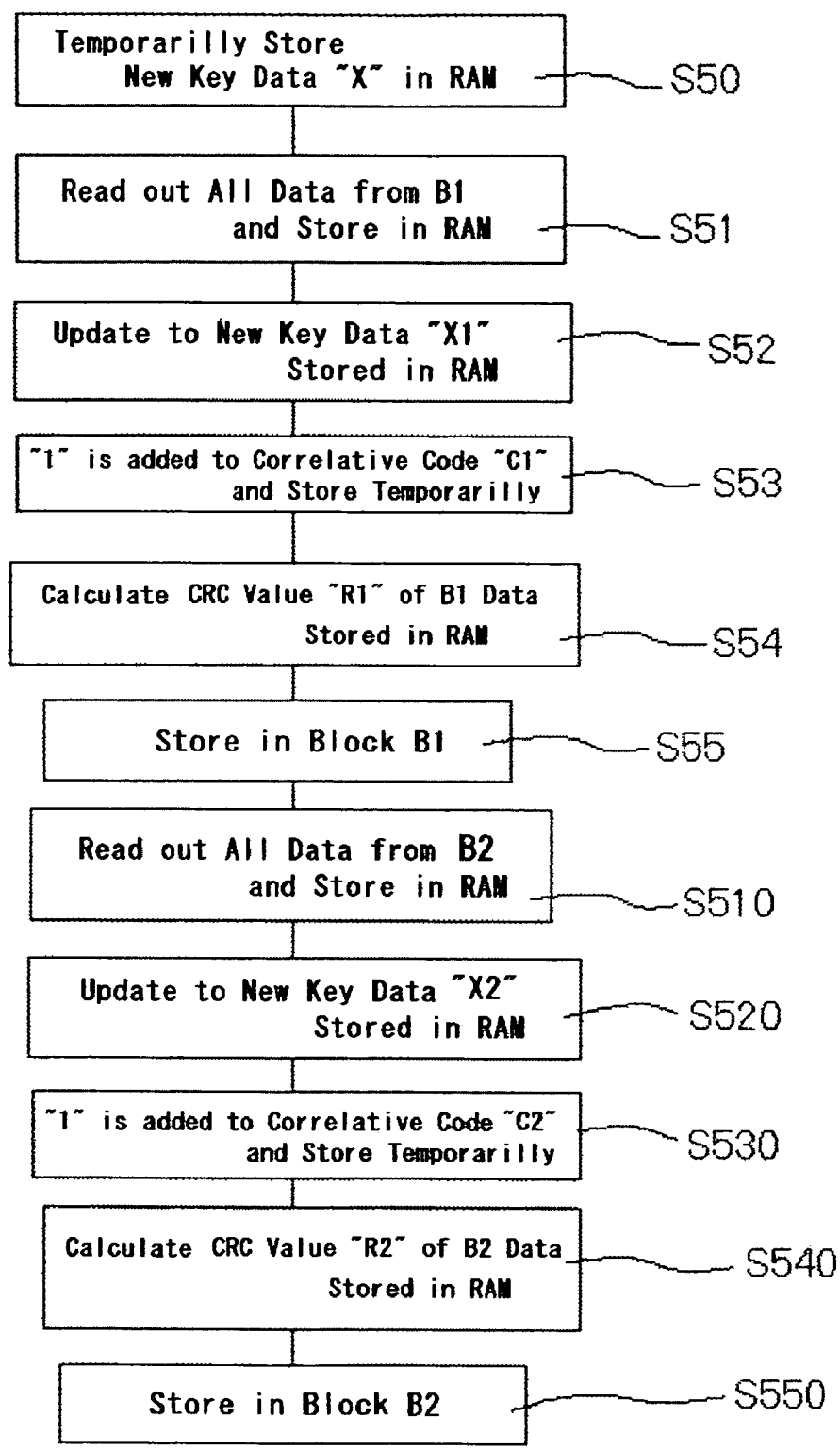
FIG. 3 is a flow chart showing an operation for overwriting data on an EEPROM in accordance with an embodiment.

FIG. 1 is a schematic view showing the construction of a nonvolatile memory 5. The nonvolatile memory 5 is an EEPROM (Electrically Erasable Programmable Read Only Memory) in accordance with an embodiment. The EEPROM 5 is provided with a plurality of blocks each of which is an erasable unit. For example, data is to be written in a predetermined number "n" of blocks comprising the block B1, B2, . . . and Bn.

Next, the construction of the respective blocks will be described below. The respective blocks B1, B2, . . . Bn are provided with write data areas B1$a$, B2$a$, . . . Bna in which data is written and stored, correlative code areas B1$b$, B2$b$, . . . Bnb in which a code indicating a correlation between the data which are written in the respective write data areas B1$a$, B2$a$, . . . Bna of the respective blocks (hereinafter, referred to as "correlative code") is stored, and inspection data areas B1$c$, B2$c$, . . . Bnc in which inspection data inspecting the validity of the data written in the write data areas B1$a$, B2$a$, . . . Bna and the correlative code and obtained in the inspection is stored in this order.

Further, in the nonvolatile memory 5 in accordance with an embodiment, one block is provided with a capacity of 16 bytes. One byte is allocated in the correlative code areas B1$b$, B2$b$, . . . Bnb, two bytes are allocated in the inspection data areas B1$c$, B2$c$, . . . Bnc, and remaining bytes are allocated in the write data areas B1$a$, B2$a$, . . . Bna. The position, order and capacity in the respective areas are not limited to the above-mentioned embodiment and may be appropriately modified based on the requirements on design. Further, an address specifying the location is added to the respective bytes.

Data is stored in the write data areas B1$a$, B2$a$, . . . Bna according to an instruction from a control device such as a host computer or a CPU. The data includes, for example, data which is required to execute a program, a key data for executing processing of encryption/decoding of data which is transmitted from the host computer and the like.

The correlative code "C" which indicates the correlation between the data which are stored in the respective blocks is written in the correlative code areas B1$b$, B2$b$, . . . Bnb when data is written in the write data areas B1$a$, B2$a$, . . . Bna. The correlative code "C" is not limited to a code but may utilize a numeral.

Specifically, when one data is divided and stored into a plurality of blocks, for example, the same code "R" is stored as the existence of correlation in the correlative code areas B1$b$, B2$b$, . . . Bnb in the corresponding blocks where the above-mentioned one data is stored. In accordance with an embodiment, the correlative code areas B1$b$, B2$b$, . . . Bnb includes a counter, in which a numeral of "0" through "255" is obtained by the CPU 4 and stored as the correlative code "R". After the correlative code "R" is counted to "255", the correlative code "R" is reset with the next counting and returns to zero.

The inspection data areas B1c, B2c, ... Bnc are allocated in the last part of the area of the respective blocks B1, B2, ... Bn. The inspection data, which inspect the validity of the data written (updated) in the write data areas B1a, B2a, ... Bna and the correlative code of the respective blocks and are obtained in the inspection, are stored in the inspection data areas B1c, B2c, ... Bnc. In other words, it is judged whether the data stored in the write data areas B1a, B2a, ... Bna and the correlative code are accurately stored or not. The inspection data is obtained by BCC (Block Check Character) on the respective blocks. In accordance with an embodiment, a well-known cyclic redundancy check (CRC) is utilized as the BCC and the CRC value "R" is written as the inspection data.

FIG. 2 is a block diagram showing the system of a card reader which is provided with the above-mentioned nonvolatile memory.

The card reader 1 includes a CPU 4 for controlling respective sections constructing the card reader 1, a ROM 4a which stores a program executed by the card reader 1 and the like, a RAM 6 in which data used in the program which is executed by the CPU 4 are stored temporarily, a nonvolatile memory 5 which stores data transmitted from a host computer 2, and a communication controller 8 which receives data transmitted from the host computer 2 and transmits data to the host computer 2. In accordance with an embodiment, data at the shipping time of the card reader 1, i.e., the data as referred to as a so-called default value is stored in the ROM 4a, and the card reader 1 is restored by using the default value in the case that an error occurs when data are updated. The card reader 1 is connected to the host computer 2, and the transmission and reception of data is performed with the host computer 2 through an interface 3.

The nonvolatile memory 5 is a content-holding type of memory and thus stored data are preserved even when supply of electric power is cut off. In accordance with an embodiment, an EEPROM (Electrically Erasable Programmable Read Only Memory) is used as the nonvolatile memory 5. Therefore, data required in communication with the host computer 2 is transmitted from the host computer 2 to the nonvolatile memory 5 and respectively stored in the blocks B1, B2, ... Bn.

The RAM 6 is a volatile memory in which all the written data are erased when supply of electric power is cut off. Data which is used in the program executed by the CPU 4 is temporarily stored in the RAM 6.

In accordance with an embodiment, the RAM 6 includes new data storage area 61 and old data storage area 62 so as to correspond to the blocks B1, B2, ... Bn in the EEPROM5 as a nonvolatile memory. The new data storage area 61 is provided with a plurality of blocks b11, b12, ... b1n and new data transmitted from the host computer 2 is written in the new data storage area 61. On the other hand, the old data storage area 62 is provided with a plurality of blocks b21, b22, ... b2n and old data stored in the nonvolatile memory 5 is written in the old data storage area 62. All the data which are written in the new data storage area 61 and the old data storage area 62 of the RAM 6 are entirely erased when power supply is cut off.

FIG. 3 is a flow chart showing operation of overwriting and storing data that are transmitted from the host computer 2 in the nonvolatile memory 5 in the card reader 1.

In accordance with an embodiment, the data that are stored in the nonvolatile memory 5 is, for example, key data which is used to perform processing of encryption/decoding. The key data is used to perform processing of encryption/decoding of data that is transmitted and received between the host computer 2 and the card reader 1 to enhance security performance of data which is transmitted and received. Specifically, the card reader 1 receives the key data from the host computer 2 to store them in the nonvolatile memory 5 and thus, data transmitted from the host computer 2 can be decoded.

Further, in accordance with an embodiment, two blocks, i.e., the block B1 and the block B2 in the nonvolatile memory 5 are used to store the data. The block B1 and the block B2 are respectively a large capacity data storage block, but only the block B1 cannot store the data and the remaining data is successively stored in the next block B2. In addition, for example, the key data transmitted from the host computer 2 is constructed of 16 bytes. The capacity of 8 bytes among 16 bytes of the key data is stored in the write data area B1a of the block B1 and the capacity of the remaining 8 bytes is stored in the write data area B2a of the block B2. However, the dividing of data is not limited to the case of the same number, i.e., 8 bytes and 8 bytes. For example, data with 13 bytes may be written in the write data area B1a of the block B1 and the remaining data with 3 bytes is written in the write data area B2a of the block B2.

Further, in accordance with an embodiment, the key data which is written and stored in the write data areas of two blocks in a divided manner is expressed as the new key data "X". Data with 8 bytes among the new key data "X" which is stored in the write data area of a first block is expressed as new key data "X1". The remaining data with 8 bytes which is stored in the write data area of a second block is expressed as new key data "X2". Similarly, the key data having been already stored in the write data area of the corresponding two blocks are expressed as old key data "Y". Data with 8 bytes among the old key data "Y" which have been stored in the first block is expressed as old key data "Y1" and the remaining data with 8 bytes which have been stored in the write data area of the second block is expressed as old key data "Y2".

In the flow chart shown in FIG. 3, new key data "X" with 16 bytes is transmitted to the CPU 4 in the card reader 1 from the host computer 2 through the interface 3 and the communication controller 8. The CPU 4 executes a program stored in the ROM 4a and new key data "X" with 16 bytes is divided and written into two blocks b11, b12 in the new data storage area 61 which is formed in the RAM 6 to be temporarily stored (step S50). In accordance with an embodiment, the new key data "X1" with 8 bytes of the new key data "X" with 16 bytes is temporarily stored in the write data area b11a of the block b11, and the remaining new key data "X2" with 8 bytes is temporarily stored in the write data area b12a of the block b12.

The CPU 4 stores all the data of the old key data "Y1" which has been stored in the block B1 of the nonvolatile memory 5 to the block b21 in the old data storage area 62 of the RAM 6 temporarily (step S51).

The old key data "Y1", which has been written in the write data area b21a in the above-mentioned block b21 in the old data storage area 62, is overwritten with the new key data "X1" which has been written in the write data area b11a of the block b11 in the new data storage area 61 and stored temporarily (step S52).

Similarly, the correlative code "c1" stored in the correlative code area b21b in the block b21 is overwritten with the numeral, which is the code added with "1" to the current code "c1", and stored temporarily (step S53).

Next, the CPU 4 calculates a new CRC value "R1" based on all the data other than the inspection data area in the block data of the block b21 which is updated in the step "S52" and the step "S53". The old CRC value "r1", which has been stored in the inspection data area b21b formed in the block b21 is overwritten with the calculated CRC value "R1". In other words, the calculated new CRC value "R1" is temporarily stored in the inspection data area b21b (step S54).

The block B1 of the nonvolatile memory 5 is overwritten and stored with the block data in the block b21, which is updated and temporarily stored, through the CPU 4 (step S55).

Similar operation is performed on the block B2. The CPU 4 temporarily stores all the data of the old key data "Y2" which is stored in the block B2 of the nonvolatile memory 5 to the block b22 in the old data storage area 62 of the RAM 6 (step S510).

The old key data "Y2", which has been written in the write data area b22a in the above-mentioned block b22, is overwritten with the new key data "X2" which has been written in the write data area b12a of the block b12 in the new data storage area 61 and stored temporarily (step S520).

The correlative code "c2" stored in the correlative code area b22b in the block b22 is overwritten with the numeral, which is the code added with "1" to the current code "c2", and stored temporarily (step S530). The block B1 and the block B2 are respectively constructed of a large capacity data storage block and the correlative code "C2" of the block b22 is the same numeral (code) as the correlative code "C1" of the above-mentioned block b12.

Next, the CPU 4 calculates a new CRC value "R2" based on all the data other than the inspection data area in the block data of the block b22 which is updated in the step S520 and the step S530. The old CRC value "r2", which has been stored in the inspection data area b22b formed in the block b22 is overwritten with the calculated CRC value "R2". In other words, the calculated new CRC value "R2" is temporarily stored in the inspection data area b22b (step S540).

The new key data "X2", the correlative code "C2" and the CRC value "R2", which are updated and temporarily stored, are transmitted to the block B2 in the nonvolatile memory 5 through the CPU 4 to be respectively written and stored into the write data area B2a, the correlative code area B2b, and the inspection data area B2c (step S550).

Figure 4:
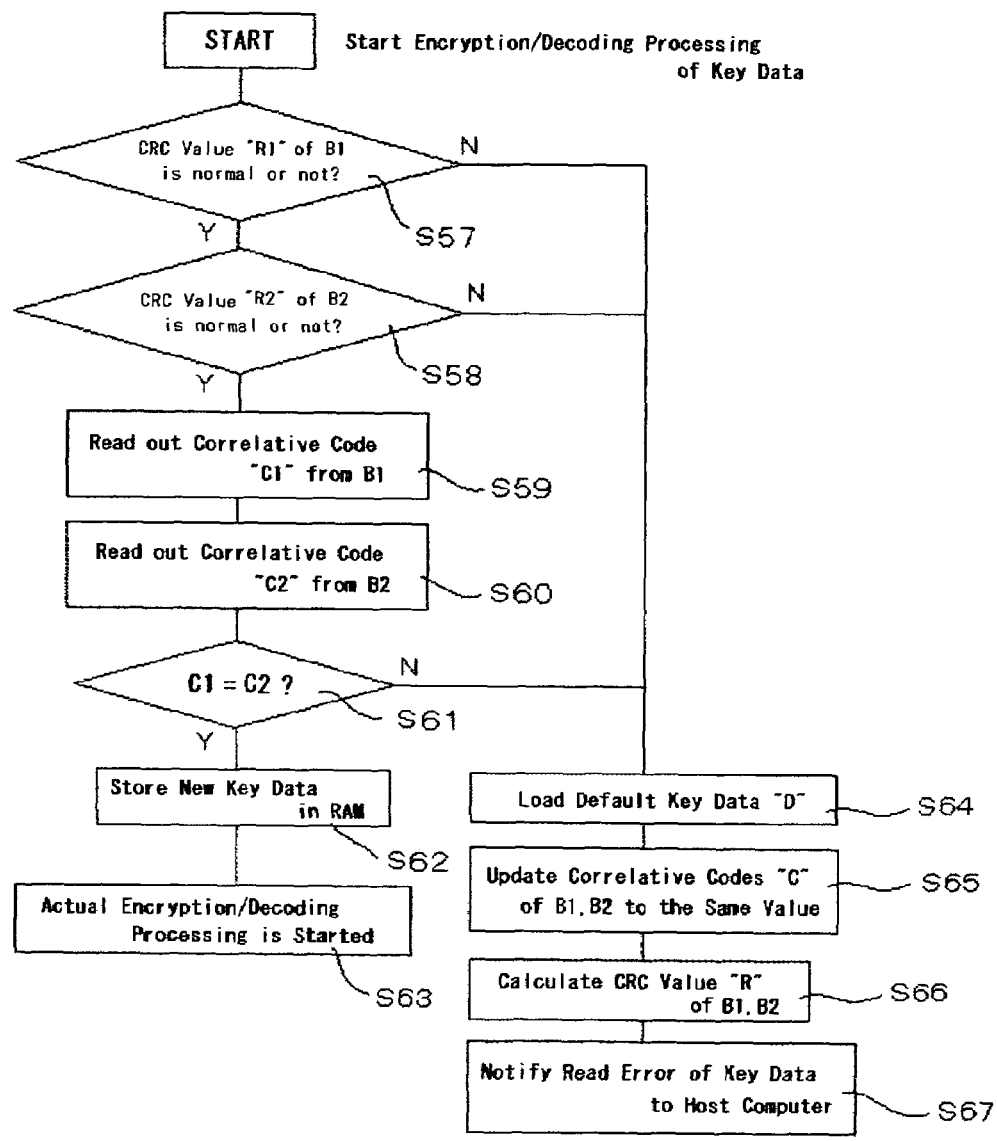
FIG. 4 is a flow chart showing an operation in a system of a card reader which is provided with an EEPROM in accordance with an embodiment.

FIG. 4 is a flow chart showing an operation at the time of encryption/decoding in the card reader 1.

First, the CRC value "R1" of the block B1, which is calculated in the step S54 in the flow chart shown in FIG. 3, is read out by the CPU 4 and inspected whether the CRC value "R1" is normal or not (step S57). The inspection method may utilize a well-known technique and thus its description is omitted.

When the inspection result is judged that the CRC value "R1" is normal (Yes), the next step S58 is executed. When the CRC value "R1" is judged to be abnormal (No), in accordance with an embodiment, the step S64 is performed where the default key data "D" at the shipping time is overwritten into the write data area B1a of the block B1 and the write data area B2a of the block B2 respectively.

Similarly, the CRC value "R2" of the block B2 which is calculated in the step S540 is read out by the CPU 4 and inspected whether the value is normal or not (step S58). When the inspection result is judged in the step S58 that the CRC value "R2" is normal (Yes), the next step S59 is executed. When the CRC value "R2" is judged to be abnormal (No), in accordance with an embodiment, the step S64 is performed wherein the default key data "D" at the shipping time is overwritten in the write data area B1a of the block B1 and in the write data area B2a of the block B2 respectively.

When the CRC value "R1" of the block B1 and the CRC value "R2" of the block B2 are judged to be normal, the correlative code "C1" of the block B1 stored in the step S53 is read out by the CPU 4 (step S59).

Similarly, the correlative code "C2" of the block B2, which is stored in the step S530 is read out by the CPU 4 (step S60).

The correlation between the correlative codes "C1" and "C2" which are read out is judged. In accordance with an embodiment, since both the block B1 and the block B2 are a large capacity storage block, the same numerical value is stored as the correlative code "C1" in the block B1b and as the correlative code "C2" in the block B2b. Therefore, it is inspected that whether the correlative codes "C1" and "C2" are the same value or not (step S61). When it is judged that the correlation values are the same, i.e., C1=C2 (Yes) in the step S61, the next step S62 is executed. When the correlation values are not the same (C1≠C2), it is judged to be abnormal (No), and in accordance with an embodiment, the step S64 is executed.

As described above, when the CRC value "R1" and the correlative code "C1" which are stored in the block B1 are judged to be normal, and when the CRC value "R2" and the correlative code "C2" which are stored in the block B2 are also judged to be normal, the new key data "X" which is updated is temporarily stored in the RAM 6 through the CPU 4 as a key data (step S62).

Processing of encryption/decoding of data, which is transmitted and received between the host computer 2 and the card reader 1, is executed by using the stored key data (step S63).

Next, the case where an error occurs in the new key data "X" stored in the blocks B1 and B2 will be described below. In the steps S57, S58, S61, when an error occurs in the stored key data and it is judged to be abnormal (No), the error may cause a problem on the normal operation of the card reader 1. Therefore, a key data is previously set which is used between the host computer 2 and the card reader 1 when an error occurs.

In accordance with an embodiment, when an error occurs, the default key data "D" which is a default value and previously stored in the ROM 4a in the CPU 4 is used until the new key data "X" is stored by a restoring operation. Specifically, when an error occurs, the CPU 4 reads out the default key data "D" (D1, D2) stored in the ROM 4a and temporarily stores respectively in the blocks b1, b2 which are formed in the new data storage area 61 of the RAM 6 (step S64). In other words, the default key data "D1a" of the default key data "D1" is stored in the write data area b1a of the block b1 and the default key data "D2a" is stored in the write data area b2a of the block b2.

Next, the same value is set in the correlative code "C1d" which is stored in the correlative code area b1b of the block b1 and the correlative code "C2d" which is stored in the correlative code area b2b of the block b2 (step S65).

A new CRC value "R1d" is calculated based on all the data other than the inspection data area among the data of the block b1 in which the default key data "D" and the correlative code "C" are updated, and the calculated CRC value "R1d" is stored in the inspection data area b1c. Similarly, a new CRC value "R2d" is calculated based on all the data other than the inspection data area among the data of the block b2 in which the default key data "D" and the correlative code "C" are updated, and the calculated CRC value "R2d" is stored in the inspection data area b2c (step S66). In this manner, the card reader 1 is restored.

Further, the host computer 2 is notified with the failure of writing of the new key data "X" (step S67).

As described above, in accordance with the embodiment, both of the following cases can be detected. The first case is that updating is interrupted in the middle when data is rewritten in respective blocks, and the second case is that updating is interrupted between the block that has been updated and the block to be updated next. In other words, the CRC value "R1" which is stored in the inspection data area B1c of the block B1 is judged in the step S57 and the new key data "X1" can be detected to be normal. Similarly, the CRC value "R2" which is stored in the inspection data area B2c of the block B2 is judged in the step S58 and the new key data "X2" can be detected to be normal. In this manner, it can be surely detected that the new key data "X" is stored in the block B1 and the block B2 respectively.

Further, in the step S61, the value of the correlative code "C1" which is stored in the correlative code area B1b of the block B1 becomes the same as that of the correlative code "C2" which is stored in the correlative code area B2b of the block b2. Therefore, it can be detected that the data stored in the write data area B1a of the block B1 is related to the data stored in the write data area B2a of the block B2 and they are a series of data.

The nonvolatile memory 5 in accordance with an embodiment is provided with a plurality of blocks B1, B2, . . . Bn which is a unit for executing writing and erasing a new key data "X" and the new key data "X" is stored in the respective blocks B1, B2, . . . Bn. For example, the blocks B1, B2 are provided with write data areas B1a, B2a in which the new key data "X" (X1, X2) is written and stored, correlative code areas B1b, B2b which store the correlative codes C1, C2 indicating the correlation between the key data "X1", "X2" that are written in the write data areas B1a, B2a of the respective blocks B1, B2, and inspection data areas B1c, B2c which store the inspection data "R1", "R2" obtained for inspection of validity of the new key data "X1", "X2" which are stored in the respective blocks B1, B2.

As described above, the nonvolatile memory 5 is provided with the inspection data areas B1c, B2c which store the inspection data "R1" and "R2" obtained for inspection of validity of the new key data "X1", "X2" which are stored in the respective blocks B1, B2. Therefore, for example, even when updating of the new key data "X1", "X2" is interrupted by interruption of power supply or the like, it can be surely detected whether the new key data "X1", "X2", which are written in the write data areas B1a, B2a in the block B1, B2, are accurately updated or not by inspection of the inspection data "R1", "R2" stored in the inspection data areas B1c, B2c.

In addition, the nonvolatile memory 5 is, for example, provided with the correlative code areas B1b, B2b which store the correlative codes C1, C2 indicating the correlation between the key data "X1" and "X2" that are written in the write data areas B1a, B2a of the respective blocks B1, B2. Therefore, for example, in the case that the new key data "X" (X1, X2) having a larger capacity than the write data areas B1a, B2a in the blocks B1, B2 is divided and stored in the write data areas B1a, B2a in a plurality of the blocks B1, B2, even when updating of the new key data "X" (X1, X2) is interrupted by interruption of power supply, the correlation between a plurality of the blocks B1, B2 can be detected.

In other words, for the new key data "X" (X1, X2) which is to be divided and stored in a plurality of the blocks B1, B2, for example, even when the new key data "X1" is stored in the block B1 and old key data "Y2" is not updated and left stored in the block B2, the correlation between a plurality of the blocks B1, B2 can be detected by inspecting the correlative code "C". Therefore, it can be judged whether all the stored key data "X" (Y) is updated and changed into the new key data "X" (X1, X2) by the inspection of the correlative code "C", and thus even when the new key data "X" and the old key data "Y" are stored as described above, it can be surely detected.

Further, the correlative code areas B1b, B2b are constructed with a counter. Therefore, a complicated program is not required to obtain the correlative codes "C1", "C2" and the correlative codes "C1", "C2" are obtained by increasing or decreasing a predetermined number and thus, a simple and fast processing can be attained. In the embodiment described above, the number "1" is used as the predetermined number to be increased.

The nonvolatile memory 5, which is provided in the card reader 1, is provided with the correlative code areas B1b, B2b and the inspection data areas B1c, B2c, and thus it can be surely detected whether the new key data "X1", "X2", which are written in the write data areas B1a, B2a in the blocks B1, B2, are accurately updated or not by the inspection of the CRC values "R1", "R2" as the inspection data which are stored in the inspection data areas B1c, B2c.

In addition, the nonvolatile memory 5 is provided with the correlative code areas B1b, B2b. Therefore, for example, in the case that a new key data having a larger capacity than the write data areas B1a, B2a in the blocks B1, B2 is divided and stored in the write data areas B1a, B2a in the blocks B1, B2, even when updating of the new key data "X1", "X2" is interrupted by interruption of power supply or the like, the correlation between the blocks B1, B2 can be detected by inspection of the correlative codes "C1", "C2".

In other words, for the new key data "X1", "X2" which are divided and stored in the blocks B1, B2, even when the new key data "X1" is stored in the block B1 and old key data "Y2" is not updated and left stored in the block B2, the correlation between the blocks B1, B2 can be detected by inspection of the correlative codes "C1", "C2" at the time of staring of the card reader 1 or the like. In this manner, abnormality of the card reader 1 can be detected before a user inserts a card, and thus the entire system including the card reader is not required to be stopped as well as not causing a trouble to a user.

Further, in the correlative code areas B1b, B2b, . . . Bnb in the nonvolatile memory 5 in the card reader 1, when the correlative codes "C" between the related blocks in the blocks B1, B2, . . . Bn do not coincide, in other words, when it is judged by the CPU 4 that the updating of new key data "X" is interrupted and only a part of information is updated, the default key data "D" stored in the ROM 4a at the time of shipping is written into the write data areas B1a, B2a, . . . Bna to rewrite the key data "X" (Y) with an error to the default key data "D" which is usable, and thus the card reader 1 can be easily restored with a short time. Therefore, the error state is avoided and operations can be continued without disturbing affairs normally performed in the card reader 1.

In accordance with the embodiment described above, the key data "X", "Y" are used as the data, but the present invention is not limited to this embodiment. Further, in the embodiment described above, the capacity of the key data "X" is 16 bytes, but a larger or smaller capacity may be utilized. Further, the write data areas B1a, B2a in the related blocks B1, B2 respectively store with 8 bytes equally, but the data may be divided into more than two blocks or may be stored in different capacities.

Further, the CRC value "R" is used as the inspection data for judging the validity of the key data "X" in the respective blocks B1, B2, . . . . Bn. However, the present invention is not limited to this embodiment and an inspection method such as "check-sum" may be used.

Further, an EEPROM is used as the nonvolatile memory 5 in the embodiment described above, but a flash memory, an FRAM (ferroelectric memory), a RAM with backup and the like, which are other rewritable nonvolatile memories, may be used.

Further, the correlative code areas B1b, B2b, . . . Bnb are constructed of a counter but the present invention is not limited to this embodiment. For example, a code indicating the correlation may be formed by using a flag. Further, a code indicating the correlation may be shown by using a character as well as a number. In addition, in the embodiment described above, the correlative code "C" indicating the correlation is increased by "1" but the increasing number is not limited to "one".

Further, an updated value is previously written in the correlative code areas B1b, B2b, . . . Bnb, and the updated value may be subtracted whenever the data writing area is updated.

Further, a data storing area for backup may be provided in the nonvolatile memory 5 in the card reader 1 and the old key data "Y" may be preserved in the data storing area for backup before the operation is performed where the old key data "Y" is overwritten and stored with the new key data "X". In this case, when updating of the new key data "X" fails, restoring operation may be performed by using the old key data "Y" instead of using the default key data "D".

In addition, the nonvolatile memory is not limited to be used in a card reader but may be used in other systems. Further, in the embodiment described above, data is transmitted and received between the card reader 1 and the host computer 2 which are located at separated locations from each other. However, for example, the present invention may be applied to the case that data is transmitted and received within a card reader or within a host computer. For example, the present invention may be applied to a case that operation history information is recorded as a series of data in a nonvolatile memory in a card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A nonvolatile memory comprising:
    a plurality of blocks as a unit for performing writing and erasing data which is stored in the respective blocks, the blocks comprising;
        a write data area in which data is written and stored;
        a correlative code area in which a correlative code indicating a correlation between the data which are written in the respective write data areas of the respective blocks is stored; and
        an inspection data area in which inspection data required in inspection is stored in the respective blocks for inspecting validity of the data.

2. The nonvolatile memory according to claim 1, wherein the correlative code area includes a counter.

3. The nonvolatile memory according to claim 1, wherein the nonvolatile memory is provided in a card reader.

4. A card reader comprising:
    means for reading a card;
    a nonvolatile memory comprising:
        a plurality of blocks as a unit for performing writing and erasing data which is stored in the respective blocks, the blocks comprising;
        a write data area in which data is written and stored;
        a correlative code area in which a correlative code indicating a correlation between the data which are written in the respective write data areas of the respective blocks is stored; and
        an inspection data area in which inspection data required in inspection is stored in the respective blocks for inspecting validity of the data.

5. A method for improving a nonvolatile memory comprising:
    providing a plurality of blocks as a unit for performing writing and erasing data which is stored in the respective blocks comprising;
        writing data in a write data area in which data is written and stored;
        providing a correlative code area in which a correlative code indicating a correlation between the data which are written in the respective write data areas of the respective blocks is stored; and
        providing an inspection data area in which inspection data required in inspection is stored in the respective blocks for inspecting validity of the data.

* * * * *